United States Patent
Smith

(10) Patent No.: US 12,202,319 B2
(45) Date of Patent: Jan. 21, 2025

(54) SYSTEM AND METHOD FOR REFRIGERANT PRESSURE AND RELIEF

(71) Applicant: FORD GLOBAL TECHNOLOGIES, LLC, Dearborn, MI (US)

(72) Inventor: Mark G. Smith, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 294 days.

(21) Appl. No.: 17/841,327

(22) Filed: Jun. 15, 2022

(65) Prior Publication Data

US 2023/0406071 A1 Dec. 21, 2023

(51) Int. Cl.
*B60H 1/32* (2006.01)
*B60H 1/00* (2006.01)

(52) U.S. Cl.
CPC ....... *B60H 1/3225* (2013.01); *B60H 1/00278* (2013.01); *B60H 1/00485* (2013.01); *B60H 1/00885* (2013.01); *B60H 2001/325* (2013.01)

(58) Field of Classification Search
CPC .............. B60H 1/3225; B60H 1/00278; B60H 1/00485; B60H 2001/325; B60H 1/00921; B60H 1/3219; B60H 2001/00928; F25B 49/02; F25B 41/20; F25B 41/40
See application file for complete search history.

(56) References Cited

U.S. PATENT DOCUMENTS

| | | | |
|---|---|---|---|
| 6,843,067 B2 | 1/2005 | Lee et al. | |
| 10,457,118 B2 | 10/2019 | Xu et al. | |
| 10,946,719 B2 | 3/2021 | Suzuki et al. | |
| 11,046,152 B2 | 6/2021 | Vehr et al. | |
| 2007/0180854 A1 | 8/2007 | Hirota et al. | |
| 2013/0248020 A1 | 9/2013 | Thybo et al. | |
| 2019/0143793 A1 | 5/2019 | Marasigan et al. | |
| 2019/0310005 A1 | 10/2019 | Cluff et al. | |
| 2020/0232683 A1 | 7/2020 | Shingu | |

FOREIGN PATENT DOCUMENTS

| | | | | | |
|---|---|---|---|---|---|
| CN | 113302437 A | * | 8/2021 | | |
| DE | 102016108571 A1 | * | 11/2016 | ............... | B60K 1/00 |
| DE | 112020002004 T5 | * | 1/2022 | ............... | F25B 41/20 |
| EP | 2937236 B1 | * | 10/2021 | ......... | B60H 1/00278 |
| JP | 2019051890 A | * | 4/2019 | ............... | B60H 1/22 |
| JP | 2019219133 A | * | 12/2019 | ......... | B60H 1/00278 |
| JP | 2020029983 A | * | 2/2020 | | |
| WO | WO-2020129495 A1 | * | 6/2020 | | |
| WO | WO-2020137235 A1 | * | 7/2020 | | |
| WO | WO-2022064944 A1 | * | 3/2022 | ......... | B60H 1/00278 |

\* cited by examiner

*Primary Examiner* — Kun Kai Ma
(74) *Attorney, Agent, or Firm* — David B. Kelley; Brooks Kushman P.C.

(57) ABSTRACT

In at least one embodiment, a vehicle climate control system including a compressor, at least one sensor, and at least one controller is provided. The compressor is configured to circulate fluid about a refrigerant loop. The at least one sensor is configured to provide a signal indicative of a pressure of the fluid in the refrigerant loop. The at least one controller is programmed to control a first valve to open to enable the fluid to flow to an evaporator for a battery responsive to the pressure of the fluid being greater than a predetermined pressure level to reduce the pressure of the fluid.

18 Claims, 3 Drawing Sheets

SYSTEM AND METHOD FOR REFRIGERANT PRESSURE AND RELIEF

TECHNICAL FIELD

Aspects disclosed herein generally relate to a system and a method for refrigerant pressure and relief. The disclosed system and method may be applied to vehicles such as, for example, a battery electric vehicle (BEV), a hybrid electric vehicle (HEV), plug-in-electric vehicle (PHEV), a fuel cell electric vehicle (FCEV), or an internal combustion engine (ICE). These aspects and others will be discussed in more detail below.

BACKGROUND

A typical refrigerant system may provide a compressor that may need to shut down on various occasions. One such occasion may involve the compressor undergoing a cycling operation in which the compressor cycles on and off to prevent an overheating condition. However, due to a high side pressure being too high, the compressor may not be able to restart right away during cycling. In one example, the high side pressure needs to drop below a threshold (e.g., approximately 17 BAR) for the compressor to start up in a normal operating mode. In this case, the compressor is generally driven by a high voltage electric motor that may be used on an electric vehicle such as a battery electric vehicle (BEV), a hybrid electric vehicle (HEV), plug-in-electric vehicle (PHEV), or a fuel cell electric vehicle (FCEV). Such a delay in restarting the compressor may enable a driver or occupant to notice a shift in cooling of a vehicle cabin, particularly if the cabin takes too long to cool.

SUMMARY

In at least one embodiment, a vehicle climate control system including a compressor, at least one sensor, and at least one controller is provided. The compressor is configured to circulate fluid about a refrigerant loop. The at least one sensor configured to provide a signal indicative of a pressure of the fluid in the refrigerant loop. The at least one controller is programmed to control a first valve to open to enable the fluid to flow to an evaporator for a battery responsive to the pressure of the fluid being greater than a predetermined pressure level to reduce the pressure of the fluid.

In at least another embodiment, a method for a vehicle climate control system is provided. The method includes circulating, via a compressor, fluid about a refrigerant loop and transmitting a signal indicative of a pressure of the fluid in the refrigerant loop. The method further includes controlling a first valve to open to enable the fluid to flow to an evaporator for a battery responsive to the pressure of the fluid being greater than a predetermined pressure level to reduce the pressure of the fluid.

In at least another embodiment, a vehicle climate control system including a compressor, at least one sensor, and at least one controller is provided. The compressor is further configured to circulate refrigerant. The at least one sensor is configured to provide a signal indicative of a pressure of the refrigerant. The at least one controller is programmed to control a first valve to open to enable the refrigerant to flow to an evaporator that maintains a temperature of a battery responsive to the pressure of the refrigerant being greater than a predetermined pressure level to reduce the pressure of the refrigerant.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Aspects disclosed herein may, among other things, mitigate a slow startup of a compressor after the compressor temporarily shuts down due to overheating or other concerns. For example, a controller may control an electronic expansion value (EXV) to at least partially open to reduce high side pressure of refrigerant on the compressor which enables a quicker response time for the compressor to start up after being shut down. The electronic expansion valve may control a flow of fluid (e.g., refrigerant) that is delivered to an evaporator for a battery (e.g., battery chiller) that maintains an optimum temperature for one or more batteries in the BEV, the HEV, the PHEV, or the FCEV.

In the situation where a controller that controls the compressor employs a delay to wait for a high side pressure to reduce below a predetermined pressure threshold (e.g., 17 Bar) to restart the compressor, the controller may control the EXV to open irrespective of the need to cool a traction battery. For example, the controller may control the EXV for a predetermined amount of time (e.g., a few seconds or up to 10 seconds) in duration. By opening the EXV, this aspect allows the flow of refrigerant from the high side to a low side of the apparatus which in turn starts to equalize the pressure of the system. The opening of the EXV may be performed irrespective of the temperature of the traction battery. Similarly, by opening the EXV, the refrigerant which may be 2-phase refrigerant (e.g., liquid and vapor) may flow into and through the battery evaporator (or chiller). The EXV may also be fluidly coupled to a cabin evaporator which may receive the refrigerant in response to the EXV being opened to relieve the high side pressure. It is recognized that in one example, the controller may control the EXV to be opened to a predetermined percentage and then subsequently closed when the pressure on the high side is below a predetermined threshold. In another example, the controller may employ a strategy that variably controls the opening of the EXV with different rates of openings or closings. These aspects and other will be discussed in more detail below.

Figure 1:
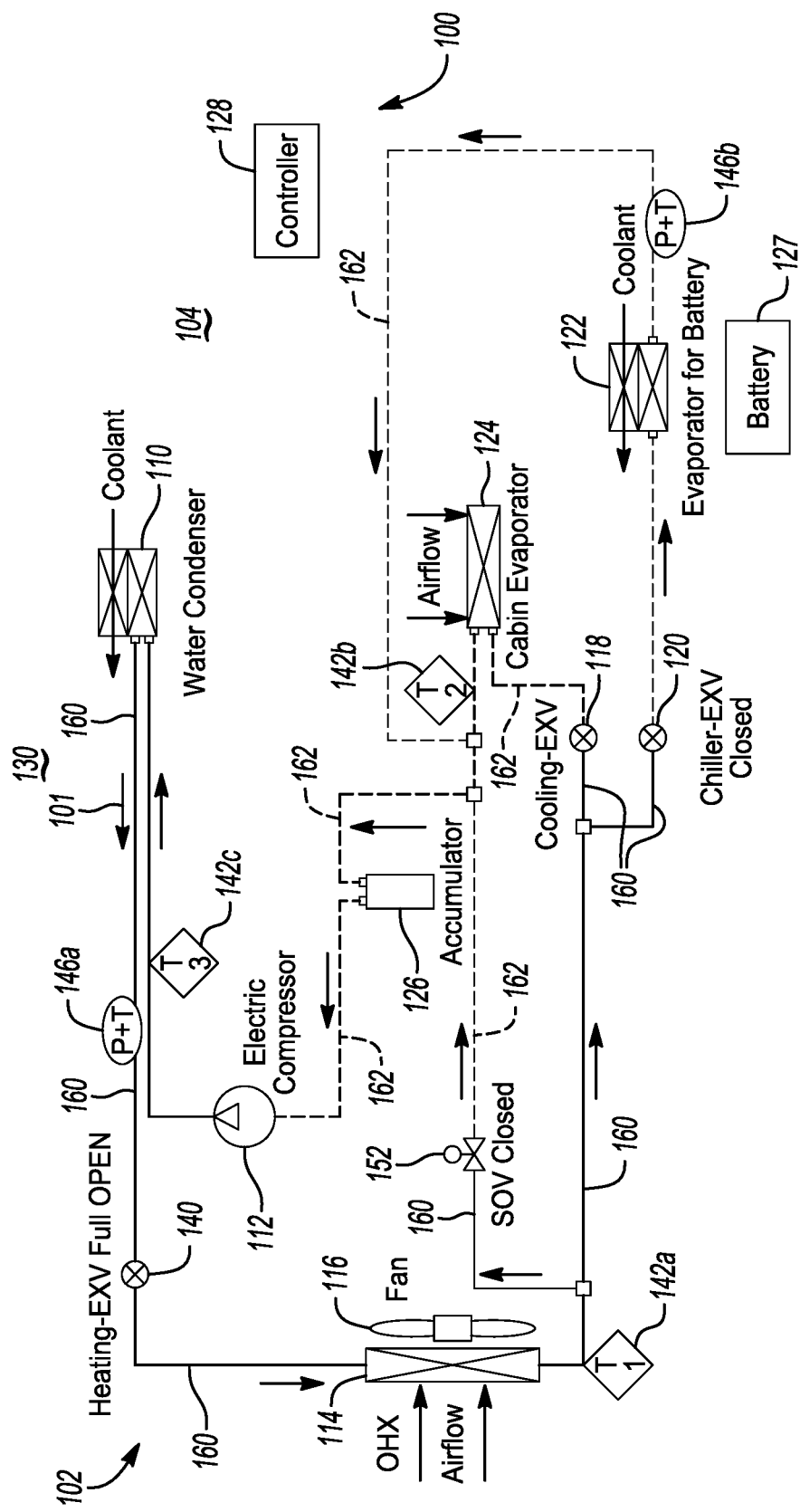
FIG. 1 depicts a system for providing refrigerant pressure and relief for a refrigeration apparatus in a vehicle in accordance with one embodiment.

FIG. 1 depicts a system 100 (e.g., vehicle climate control system 100) for providing refrigerant pressure and relief for a refrigeration apparatus 102 in a vehicle 104 in accordance with one embodiment. In one example, the refrigeration apparatus 102 that may be used to heat or cool an interior cabin of the vehicle 104. The refrigeration apparatus 102 may be referred to as an air conditioning system, heat pump, or refrigeration system. In one example, the refrigeration apparatus 102 includes a vapor injection heat pump (VIHP) (not shown) or other suitable apparatus. The system 100 includes a condenser 110, a compressor (or pump) 112, an outside heat exchanger (OHX) 114, an evaporator 122 (or evaporator for a battery 127), an evaporator 124, an accumulator 126, and at least one controller 128 (the controller 128). The system 100 generally distributes refrigerant in a refrigerant loop 101 through the condenser 110, the compressor 112, the OHX 114, the evaporator 122 for the battery 127. the evaporator 124, and the accumulator 126. In one example, the evaporator 122 for the battery 127 may be a chiller. In general, the refrigerant may pass through the noted components at different pressure rates. The system 100 delivers the refrigerant through the apparatus 102 to heat or cool the interior cabin of the vehicle 104. This aspect will be discussed in more detail below. It is recognized that the refrigerant may correspond to R134a, R1234yf, glycol or other suitable alternative. In one example, the coolant may be a 50/50 mixture of ethylene glycol and water.

The condenser 110 may be implemented as a water-cooled condenser and transfers heat from the refrigerant to coolant. As the refrigerant passes through the condenser 110, the refrigerant changes from a high pressure and temperature vapor state into a high-pressure fluid state. The apparatus 102 circulates the refrigerant via the compressor 112 to OHX 114. A fan 116 may be adjacent to the OHX 114 to pass air across the OHX 114 to reject heat to ambient when operating in a cooling mode to cool the cabin of the vehicle 104. A first valve 140 is generally positioned between the compressor 112 and the OHX 114 to control the flow of the refrigerant to the OHX 114. The pressure of the refrigerant in the line formed between the condenser 110, the OHX 114 may be high. For example, in certain moments, the pressure may be above a predetermined pressure threshold such as, but not limited to, 17 Bar. A second valve 118 may be positioned between the OXH 114 and the evaporator to control the flow of refrigerant to the evaporator 124. A third valve 120 may be positioned between the OHX 114 and the chiller 122 to control the flow of refrigerant to the chiller 122. Each of the second valve 118 and the third valve 120 may be generally defined as an electronic expansion valve (EXV) that may be used to expand the high-pressure fluid refrigerant into a low-pressure fluid that comprises liquid and a vapor refrigerant mixture. In one example, the second valve 118 and the third valve 120 may include a motorized needle valve that is moveable along an axis to adjust the flow the refrigerant that is controlled by the controller 128.

The OHX 114 generally absorbs heat from the outside air that flows across itself or may reject heat to an outside air based on the operating mode of the apparatus 102. The OHX 114 may be considered an evaporator or a condenser. The evaporator 124 evaporates low pressure liquid refrigerant into a vapor refrigerant. Air may be provided by a cooling fan (not shown) to flow across the evaporator 124 which provides a cooled and dehumidified air for the cabin of the vehicle 104. The accumulator 126 serves as a storage device to store refrigerant. For example, the accumulator 126 separates the liquid from the vapor refrigerant that enters into the accumulator 126. The accumulator 126 generally delivers primarily vapor refrigerant back to the compressor 112. The accumulator 126 includes a bleed hole in a return tube (not shown) that may be positioned on a bottom side of the accumulator 126. A portion of the refrigerant oil circulates through the apparatus 102 and may need to be returned to the compressor 112. The compressor 112 may include an integrated separator for separating the oil. The integrated separator may generally be positioned on a discharge end to separate the oil.

One or more batteries 127 may be positioned about the chiller 122. The chiller 122 generally maintains an optimum working temperature for the battery 127. In example, the chiller 122 may be implemented as a compact plate-to-plate heat exchanger that transfers thermal energy from a battery coolant loop to the apparatus 102. The chiller 122 provides uniform cell cooling for the battery 127 for increased battery durability and performance. High pressure refrigerant may be positioned between the compressor 112 and the second and the third valves 118, 120. In moments in which the pressure of the refrigerant that flows between the compressor 112 and the OHX 114 exceeds the predetermined threshold, the controller 128 may control the third valve 120 that is associated with the chiller 122 to open to a predetermined opening to expand the high-pressure liquid refrigerant into a low-pressure refrigerant of liquid and vapor mixture. This aspect may reduce the pressure of the refrigerant more rapidly and may be advantageous to employ when the compressor 112 cycles down and it is required to start-up the compressor 112 at a quicker rate. The controller 128 may control the second valve 118 to a position where the second valve 118 was for continuing control of refrigerant flow to the evaporator 124. The third valve 120 may be opened and closed to accommodate pressure relief. The first valve 140 may stay wide open when the system 100 is operating in a cabin cooling mode. For a system that include both the second and the third valves 118, 120, employing the methodology of controller the third valve 120 to open to reduce pressure may be more advantageous for implementation. It is recognized however, that the second valve 118 may also be opened to relieve high pressure on the high side as an outlet of the evaporator 124 also feeds the accumulator 126. In general, sections 160 around the apparatus 102 generally correspond to areas of the system 100 where the refrigerant may experience high pressure. In addition, sections 162 around the apparatus 102 generally correspond to areas of the system 100 where the refrigerant may experience a low pressure. The allocation of the sections 160 and 162 generally corresponds to the pressure of the refrigerant when the system 110 operates in a cooling mode. The location and sizes of the sections 160 and 162 may shift when the system 100 operates in different modes (e.g., heating mode).

As noted above, the system 100 also includes the first valve 140 that may also be implemented as an electronic expansion valve. The first valve 140 may be positioned between the condenser 110 and the OHX 114. Various temperatures sensors 142a, 142b, 142c may be positioned within the apparatus 102 and may provide temperature readings of the refrigerant to the controller 128. The system 100 also includes first and second temperature and pressure sensors 146a, 146b to provide temperatures readings and pressure readings, respectively, to the controller 128. In a cooling mode, the controller 128 may use the temperature readings for superheat and temperature limit calculations. In addition, the system 100 includes a shut off valve (SOV) 152. The SOV 152 may be wide open or closed. The SOV 52 may be used to open a flow path in a de-icing mode. When the system 100 is operating in a heating mode, the OHX 114 functions as an evaporator and may be cold enough to form ice particles thereon. The de-icing mode may be used to warm the OHX 114 to remove the ice particles.

Figure 2:
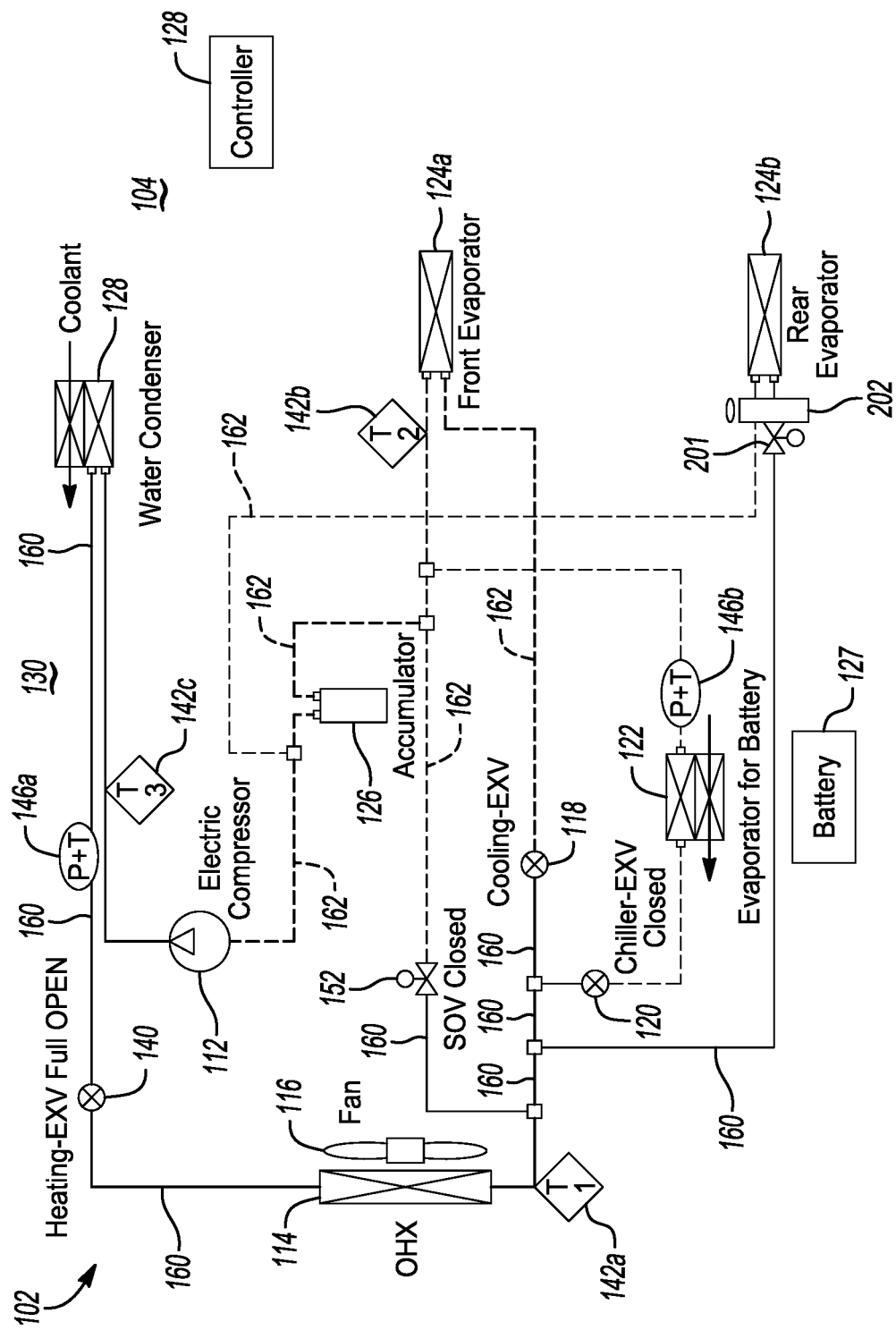
FIG. 2 depicts another system for providing refrigerant pressure and relief for the refrigeration apparatus in a vehicle in accordance with one embodiment.

FIG. 2 depicts another system 200 for providing refrigerant pressure and relief for the refrigeration apparatus 102' in the vehicle 104 in accordance with one embodiment. The system 200 is generally similar to the system 100 as illustrated in connection with FIG. 1. However, the system 200 includes a first evaporator 124a (or front evaporator 124a) and a second evaporator 124b (or rear evaporator 124b). The front evaporator 124a provides cooling for occupants positioned in a front of the vehicle 104. The second evaporator 124b provides cooling for occupants positioned in a rear of the vehicle 104. The system 200 includes a shutoff valve (SOV) (or valve) 201 and a thermostatic expansion valve (TXV) 202 positioned at an inlet of the rear evaporator 124b. The SOV 201 may shut off flow of the refrigerant when cooling is not desired. The TXV 202 is generally a throttling device for refrigerant that controls to the refrigerant to a superheat value. In one example, the TXV 202 may be a self-contained mechanical device that is void of control wires. In one example, the SOV and the TXV may be implemented as an integrated device.

As noted above, high pressure refrigerant may be positioned between the compressor 112 and the second and the third valves 118, 120. In moments in which the pressure of the refrigerant that flows between the compressor 112 and the OHX 114 exceeds the predetermined threshold, the controller 128 may control the third valve 120 that is associated with the chiller 122 to open to a predetermined opening to expand the high-pressure liquid refrigerant into a low-pressure refrigerant of liquid and vapor mixture. This aspect may reduce the pressure of the refrigerant more rapidly and may be advantageous to employ when the compressor 112 cycles down and it is required to start-up the compressor 112 at a quicker rate.

As noted above, the third valve 120 may be an EXV that flashes the high-pressure refrigerant into a low-pressure liquid and vapor mixture. Given that an outlet of the chiller 122 (or evaporator 122) feeds into the accumulator 126, the controller 128 may control the valve 120 to open as desired without any concern with respect to sending liquid back to the compressor 112 as the accumulator 126 separates the liquid from the vapor. Thus, in this regard, it is acceptable for the coolant to flow through the chiller 122 or conversely not flow through the chiller 122. As an alternative, it is possible to open the valve 201 to perform a similar function that may be as effective as opening the valve 120.

Figure 3:
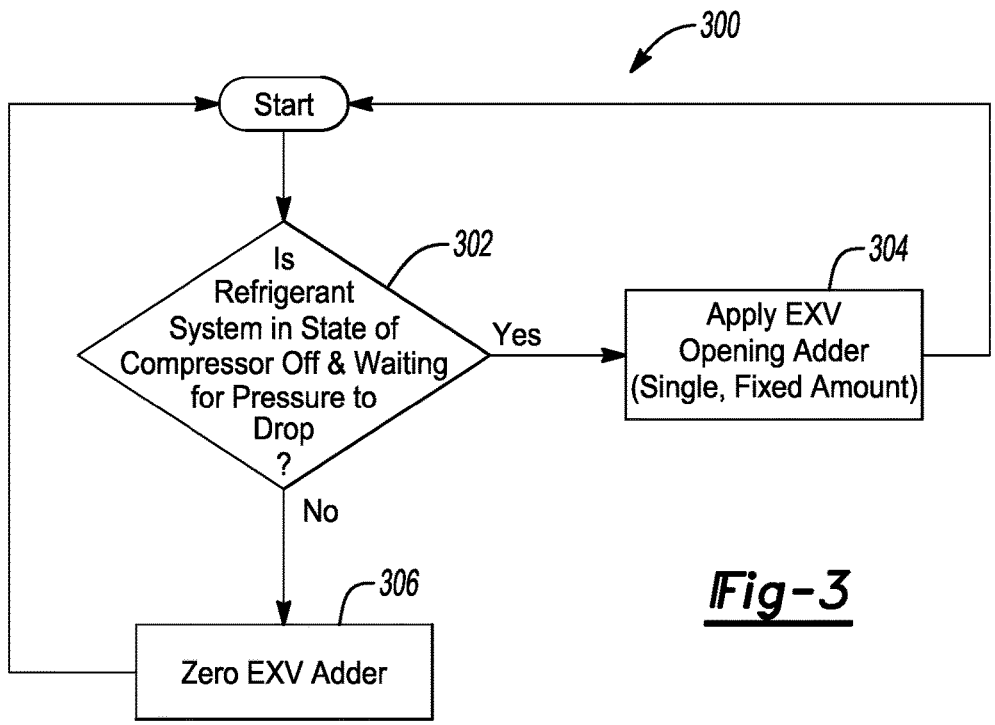
FIG. 3 depicts a method for providing refrigerant pressure and relief for the disclosed system(s) in accordance with one embodiment.

FIG. 3 depicts a first method 300 for providing refrigerant pressure and relief for the disclosed system(s) in accordance with one embodiment.

In operation 302, the controller 128 determines whether the compressor 112 is in an off state or off mode and further monitors the overall pressure of the refrigerant that is provided by the pressure sensor 146a. For example, the first temperature and pressure sensor 146a may be positioned anywhere between the compressor 112 and the third valve 120 to provide pressure readings of the refrigerant to the controller 128. If the controller 128 determines that the compressor 112 is in the off state and that the pressure in the system 100 is above a predetermined pressure threshold, then the method 300 moves to operation 304. If not, then the method 300 moves to operation 304. In general, the pressure sensor 146 being positioned anywhere on the high side 160 of the system 100 (e.g., compressor 112 to valve 120) may be considered optimal.

In operation 304, the controller 128 controls the third valve 120 to open to a single, predetermined amount to reduce the pressure build up in the refrigerant between the compressor 112 and the third valve 120. In one example, the predetermined amount of the opening of the third valve 120 may be 25% of the operating range. This may vary based on valve size and geometry of the throttling or throat area.

In operation 306, the controller 128 may continue to control the third valve 120 to remain in its current state as it is not necessary to reduce pressure in the refrigerant give that the pressure between the compressor 112 and the third valve 120 is considered suitable and further in the event the compressor 112 is still running.

Figure 4:
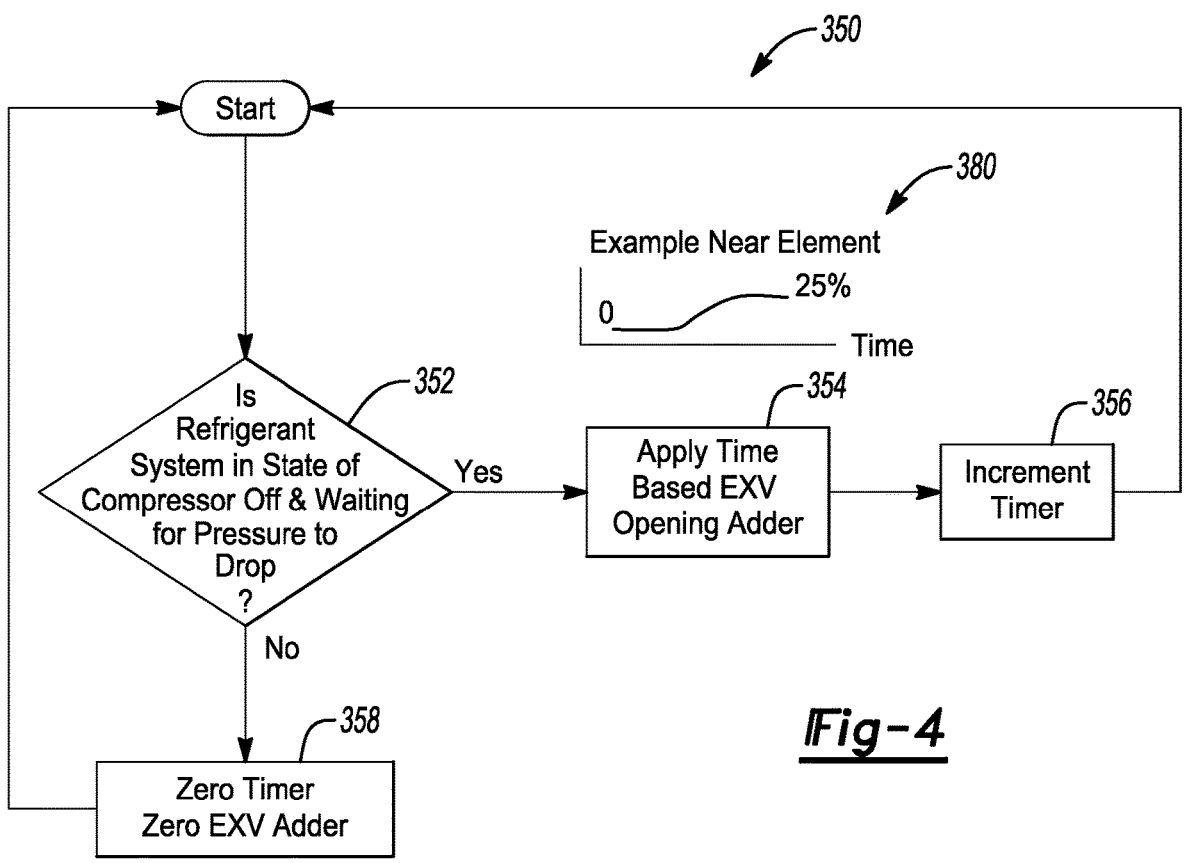
FIG. 4 depicts another method for providing refrigerant pressure and relief for the disclosed system(s) in accordance with one embodiment.

FIG. 4 depicts a second method 350 for providing refrigerant pressure and relief for the disclosed system(s) in accordance with one embodiment.

In operation 352, the controller 128 determines whether the compressor 112 is in an off state or off mode and further monitors the overall pressure of the refrigerant that is provided by the pressure sensor 146a. For example, the first temperature and pressure sensor 146a may be positioned anywhere between the compressor 112 and the third valve 120 to provide pressure readings of the refrigerant to the controller 128. If the controller 128 determines that the compressor 112 is in the off state and that the pressure in the system 100 is above a predetermined pressure threshold, then the method 350 moves to operation 354. If not, then the method 350 moves to operation 358.

In operation 354, the controller 128 applies a time-based control strategy for controlling the opening of the third valve 120 to reduce the pressure build up in the refrigerant between the compressor 112 and the third valve 120. One example of the time-based control strategy is generally shown at 380. The strategy 380 (as executed by the controller 128) may involve the controller 128 determining the length of time that the compressor 112 has been deactivated and moving further along the x-axis to open the third valve to a maximum predetermined amount (e.g., 25%) in the event the controller 128. In other words, the controller 128 opens the third valve 120 at a faster rate to reach the maximum predetermined amount to decrease the amount of time that the compressor 112 is reactivated or turned back on. In one example, the controller 128 may employ a timer of three to five seconds, for example, before the controller 128 opens the third valve 120 as seen by the strategy 380 (e.g., on the left-hand side of the curve). This may provide for an adequate amount of time to enable the high side pressure to drop.

In operation 354, the controller 128 increments the timer and returns to operation 352 to reassess the pressure level of the refrigerant between the compressor 112 and the third valve 120.

In operation 358, the controller 128 may continue to control the third valve 120 to remain in its current state as it is not necessary to reduce pressure in the refrigerant give that the pressure between the compressor 112 and the third valve 120 is considered suitable and further in the event the compressor 112 is still running.

It is recognized that the controllers/devices as disclosed herein and in the attached Appendix may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle climate control system comprising:
   a compressor configured to circulate fluid about a refrigerant loop;
   at least one sensor configured to provide a signal indicative of a pressure of the fluid in the refrigerant loop; and
   at least one controller programmed to control a first valve to open to enable the fluid to flow to an evaporator for a battery responsive to the pressure of the fluid being greater than a predetermined pressure level to reduce the pressure of the fluid,
   wherein the at least one controller is further programmed to control the first valve to open to enable the fluid to flow to the evaporator for the battery responsive to the compressor being in an off state.

2. The vehicle climate control system of claim 1, wherein the at least one controller is further programmed to control the first valve to open to a fixed opening level to enable the fluid to flow to the evaporator of the battery responsive to the pressure of the fluid being greater than the predetermined pressure level.

3. The vehicle climate control system of claim 1, wherein the at least one controller is further programmed to variably open the first valve to a first maximum level responsive to a length of time the compressor has been in the off state.

4. The vehicle climate control system of claim 1, wherein the at least one controller is further programmed to increase a timer responsive to variably opening the first valve and to the pressure of the fluid continuing to be greater than the predetermined pressure level.

5. The vehicle climate control system of claim 1, wherein the first valve is an electronic expansion valve that converts the pressure of the fluid into a lower pressure liquid and vapor mixture.

6. The vehicle climate control system of claim 1, wherein the evaporator for the battery is configured to cool the battery on a vehicle.

7. The vehicle climate control system of claim 1, wherein the evaporator for the battery provides a portion of the fluid to an accumulator that separates vapor refrigerant from the portion of the fluid.

8. The vehicle climate control system of claim 7, wherein the accumulator is configured to provide the vapor refrigerant to the compressor and to separate liquid from vapor in the fluid.

9. A method for a vehicle climate control system, the method comprising:
   circulating, via a compressor, fluid about a refrigerant loop;
   transmitting a signal indicative of a pressure of the fluid in the refrigerant loop; and;
   controlling a first valve to open to enable the fluid to flow to an evaporator for a battery responsive to the pressure of the fluid being greater than a predetermined pressure level to reduce the pressure of the fluid; and
   controlling the first valve to open to enable the fluid to flow to the evaporator for the battery responsive to the compressor being in an off state.

10. The method of claim 9 further comprising controlling the first valve to open to a fixed opening level to enable the fluid to flow to the evaporator for the battery responsive to the pressure of the fluid being greater than the predetermined pressure level.

11. The method of claim 9 further comprising controlling the first valve to variably open to a first maximum level based on a length of time the compressor has been in the off state.

12. The method of claim 11 further comprising increasing a timer responsive to variably opening the first valve and the pressure of the fluid continuing to be greater than the predetermined pressure level.

13. The method of claim 9, wherein the first valve is an electronic expansion valve that converts the pressure of the fluid into a lower pressure liquid and vapor mixture.

14. The method of claim 9 further comprising cooling the battery on a vehicle via the evaporator.

15. The method of claim 9 further comprising providing, via the evaporator for the battery, a portion of the fluid to an accumulator that separates vapor refrigerant from the portion of the fluid.

16. The method of claim 15 providing, via the accumulator, the vapor refrigerant to the compressor.

17. A vehicle climate control system comprising:
   a compressor configured to circulate refrigerant;
   at least one sensor configured to provide a signal indicative of a pressure of the refrigerant; and
   at least one controller programmed to control a first valve to open to enable the refrigerant to flow to an evaporator that maintains a temperature of a battery responsive to the pressure of the refrigerant being greater than a predetermined pressure level to reduce the pressure of the refrigerant, and
   wherein the at least one controller is further programmed to control the first valve to open to enable the refrigerant to flow to the evaporator responsive to the compressor being in an off state.

18. The vehicle climate control system of claim 17, wherein the first valve is an electronic expansion valve that converts the pressure of the refrigerant into a lower pressure fluid and vapor mixture.

* * * * *